Oct. 11, 1955 J. S. MILLER 2,720,025
ASSEMBLY OF ARTIFICIAL TEETH
Filed May 17, 1954 2 Sheets-Sheet 1
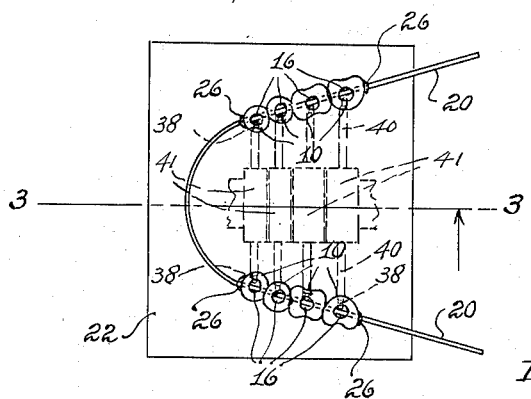
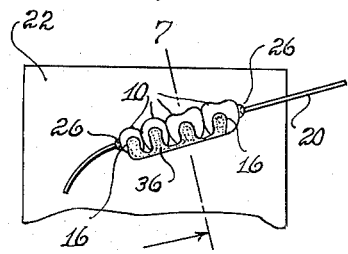
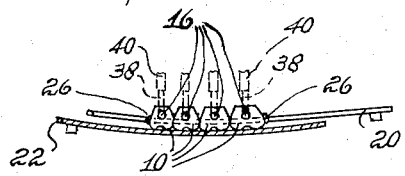
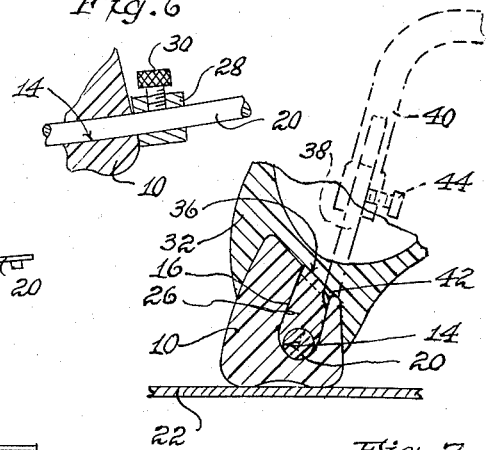
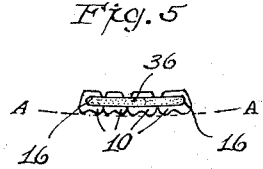
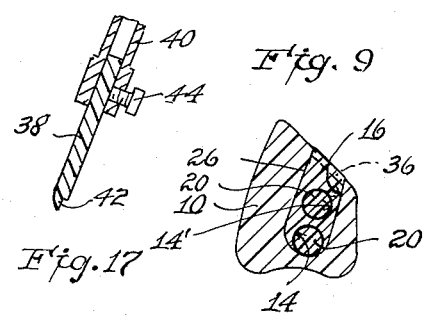
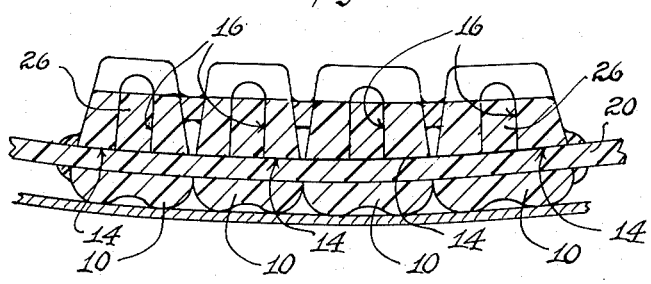
James S. Miller
INVENTOR.
BY J. N. Nell
ATTORNEY

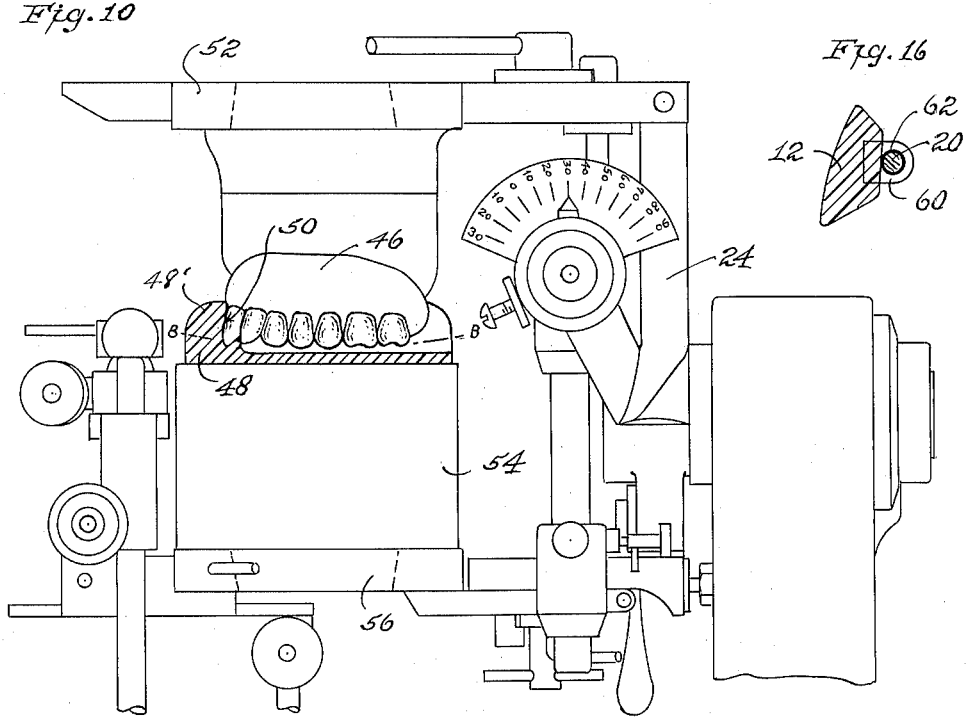
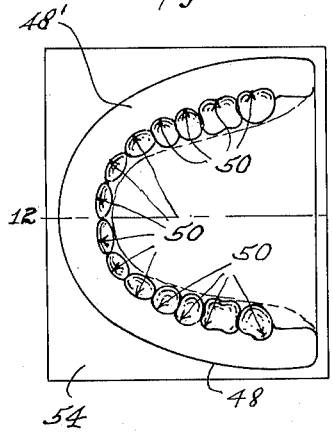
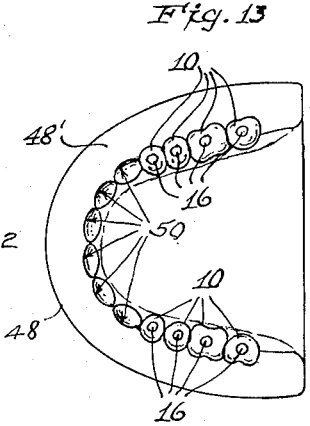
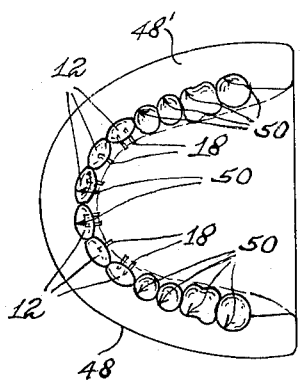
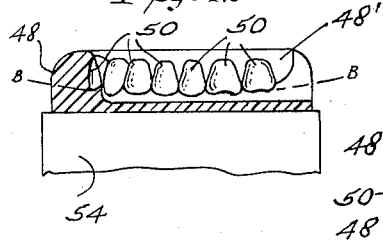

United States Patent Office 2,720,025
Patented Oct. 11, 1955

2,720,025
ASSEMBLY OF ARTIFICIAL TEETH
James S. Miller, Trenton, N. J.

Application May 17, 1954, Serial No. 430,278

10 Claims. (Cl. 32—11)

This invention relates to the making of artificial dentures, and more particularly to the assembling of individual artificial teeth in rows suitable for mounting in the permanent denture plates.

One of the principal objects of the present invention is to provide simple, inexpensive and efficient means for the precise assembling of the posterior and the anterior teeth of an artificial denture in separate rows with the occlusal ends of the teeth in each row curved in conformity with the occlusal plane and the lateral thrust of the natural teeth of a person for whom artificial dentures are to be made, and to secure the teeth integrally together in such curved relation.

Another object of this invention is to provide means for joining the artificial teeth together in the manner referred to, but with provision for a slight lateral flexibility of each row of teeth.

A further object of the invention is to provide in such an assembly of artificial teeth as that above mentioned, means for securing all the teeth in a row to a flexible rod in cooperation with means formed in or carried by the respective teeth, the rod being made of a material which will unite in a permanent denture plate with the securing means and the base of the denture with the teeth all rigidly held in preformed curved relation of their occlusal ends.

Another object of the invention is to provide a support for assembling thereon both posterior and anterior teeth of an artificial denture, the support being provided with a curved surface preformed in accordance with the occlusal plane and the lateral thrust of the natural teeth of a person for whom artificial dentures are to be made and on which curved surface the occlusal ends of the teeth are seated while means for rigidly securing the teeth together is applied to said teeth.

Another object of the present invention is to provide a support of the character mentioned above also having a rim surrounding the curved surface referred to, the rim having recesses in its inner wall to receive the frontal portions of the teeth and to provide means in conjunction with said support for holding the occlusal ends of the teeth in contact with the curved surface while means for rigidly securing the teeth together is applied thereto.

A further object of the invention is to provide mechanical means for holding the artificial teeth in firm contact with the curved surface of the support until the teeth are securely joined together.

Other objects and advantages of my invention will be apparent from the following specification and the accompanying drawings forming a part thereof, in which:

Fig. 1 is a top plan view of two rows of posterior teeth of conventional design with one embodiment of my invention applied thereto;

Fig. 2 is a fragmentary view similar to Fig. 1 and showing another feature of my invention;

Fig. 3 is a section taken on the line 3—3 of Fig. 1;

Fig. 4 is a side view of a flexible rod for joining artificial teeth together;

Fig. 5 is an inside elevation of a row of artificial teeth rigidly joined together, as seen after removal from the curved plate shown in Fig. 1 and after the projecting portions of the flexible rod shown in Fig. 1 have been removed from the teeth;

Fig. 6 is an enlarged detail view showing one form of device for securing artificial teeth to a flexible rod;

Fig. 7 is an enlarged sectional view through an artificial tooth of conventional design and showing certain features of my invention applied thereto;

Fig. 8 is an enlarged longitudinal section of a row of teeth joined to a flexible rod, as shown in Fig. 7;

Fig. 9 is a sectional view of a modified tooth construction;

Fig. 10 is a side elevation of the upper portion of an articulator having an artificial condyle, and showing one embodiment of my invention in connection therewith;

Fig. 11 is a top plan view of a mold or form for assembling artificial teeth therein without the use of a flexible rod or wire;

Fig. 12 is a section taken on the line 12—12 of Fig. 11;

Fig. 13 is a plan view similar to Fig. 11 and showing two rows of posterior artificial teeth in assembled relation;

Fig. 14 is a view similar to Fig. 13, but showing only the anterior artificial teeth in assembled relation;

Fig. 15 is a section of an anterior tooth of conventional design;

Fig. 16 is a section of an anterior tooth of modified construction; and

Fig. 17 is a detail view of a finger for holding a tooth on contact with a curved surface.

Referring to the drawings in which like numerals designate like parts or elements in the several views, it will be seen that in the various embodiments of my invention the ultimate purpose is to provide assemblies of the two groups of artificial teeth for an artificial denture plate, namely the posterior teeth and the anterior teeth, in separate rows with the occlusal ends of the teeth in curved relation corresponding to the occlusal plane and the lateral thrust of the natural teeth of a person for whom artificial dentures are to be made, and to secure the teeth of each row rigidly together with respect to the curved relation referred to, but in such a manner as to permit a slight degree of lateral flexibility of each row. It will be seen further that in the making of such assemblies as those mentioned, my invention in one embodiment thereof contemplates the utilization of a support having a surface which has been preformed to correspond to the occlusal plane and the lateral thrust of the natural teeth of a person for whom artificial dentures are to be made, by means of previously developed devices which, per se, form no part of the present invention. It will also be seen that in certain embodiments of my invention a preliminary step in the procedures mentioned is the assembly of all the teeth in a row on a rod or strip of flexible material which can initially be bent in any direction; and that finally all the teeth in the row may be rigidly attached to this rod or strip with their occlusal ends in curved relation as formed by the curved surface referred to.

In the embodiments of my invention illustrated in the drawings the posterior artificial teeth, comprising the molars and the bicuspids, are all designated by the numeral 10, and the anterior teeth by the numeral 12. The teeth illustrated are of generally conventional design and are commonly provided with anchoring features, such as the transverse through openings 14, and sockets 16 of the posterior teeth, which sockets extend from the root ends of the teeth to the transverse openings, and the projections 18 which extend rearwardly from the anterior teeth 12. Such features are utilized in various embodiments of my invention in securing the artificial teeth to a flexible rod 20, which may be round, square or other desired cross-sectional shape, and it may be made of various kinds of flexible material, although there are certain advantages, for the purposes intended, in making this rod of a plastic material, as will hereinafter be explained.

As illustrated in Figs. 1, 2 and 3, opposite rows of posterior artificial teeth 10 may be assembled on a flexible rod 20 with the occlusal ends of the teeth seated on a resilient plate 22 in which a curve has been preformed by means of an articulator 24 of the type illustrated in Fig. 10, as fully described in my co-pending application Serial No. 327,723 or by other suitable means, this curve corresponding to the plane of occlusion and lateral thrust of the natural teeth of a patient according to the condylar inclination of the patient as found and set up on the articulator mentioned. It should be understood, in reference to Fig. 3, that means (not shown) is provided in practice for rigidly maintaining the plate 22 in the curved relation formed by the articulator as described in the co-pending application referred to.

The teeth 10 may be initially fixed against sliding movement on the rod 20 by means of applying hardening plastic material 26 to the rod and the outer surfaces of the end teeth in the row as shown. However, other means for such purpose may be used, such, for example, as a slidably adjustable collar 28, held in position on the rod 20 by a set screw 30, as illustrated in Fig. 6. With either arrangement the teeth will be pressed into firm contact with the curved surface of the plate 22 by means of individual fingers as illustrated in the co-pending application referred to, and in dotted lines in Figs. 1, 3 and 7 of the present application. As shown in Fig. 17 the fingers referred to may include a hardened plastic tooth engaging portion 38 adjustably mounted in a holder 40, and held in axially adjusted position in the holder by a set-screw 44, the holders 40 being mounted on the supports 41 (shown dotted in Fig. 1). As more clearly shown in Fig. 7 the tooth engaging point 42 can be broken from the tooth 10 after the socket 16 has been filled with hardening plastic material 26 and the material hardened. The teeth in a row after being rigidly joined together, either on the rod 20, or without such rod, are molded into the denture base 32, which is also of hardening plastic material. The denture plate is then subjected to heat at a relatively high temperature which causes all the material connected with the teeth to unite into an integral mass. If the teeth are made of plastic material other than porcelain they will also be united with all the other material in the denture plate.

In the procedure described the artificial teeth in each row will be applied to the denture base 32 with the occlusal ends of all the teeth in the same precisely curved relation as formed by the curved surface of the support 22, or other support in which the desired curve has been preformed.

As explained in my co-pending application referred to, the plate 22 may be made in the form of a rigidly curved template by means of the articulator illustrated in Fig. 10, thus facilitating the assembly of any desired number of rows of artificial teeth in accordance with the preformed curve, without further cooperation with the specific articulator referred to.

The form of tooth 10 shown in Fig. 9 is provided with two transverse openings 14 and 14' to receive two rods 20, instead of one, thus initially holding the tooth against rotary movement on the rod.

Referring to Figs. 10 to 16, after the articulator 24 has been employed to produce a single complete artificial denture plate 46 with the posterior and the anterior teeth in the assembled curved relation according to the occlusal plane and lateral thrust of the natural teeth of an individual, as indicated by the dotted lines B—B in Figs. 10 and 12, the completed denture may be used as a pattern, as shown in Fig. 10, to produce a molded support 48 having therein not only a properly curved surface upon which the occlusal ends can be seated but also a surrounding rim portion 48' provided with depressions or recesses 50 to receive and support the frontal portions of all the teeth, as clearly illustrated in the several views mentioned. The denture plate 46, which is shown in side elevation, is set up on the upper articulator member 52 and the molded support 48, shown in section, is produced by placing a mass of hardening plastic material on a spacer block 54 mounted on the lower articulator member 56 and pressing the denture with all the teeth into the material, which becomes a rigid form after the material hardens. Thereafter any number of sets of teeth may be precisely assembled on the support corresponding to the curve of the teeth from which the support was formed.

Preferably, the posterior teeth and the anterior teeth are assembled separately in the recesses 50 of the support 48. In Fig. 13 the posterior teeth are shown in assembled relation, and in Fig. 14 the anterior teeth are shown thus assembled. A small quantity of hardening plastic or cementing substance 58 (Fig. 15) may be applied to the front of each tooth to hold the teeth firmly in contact with the curved surface of the support 48. After the teeth are fixed in the support, hardening plastic material 26 is applied to the teeth. After the plastic material is hardened, the teeth will be rigidly joined together, except that the plastic material will permit a slight lateral flexing of the row of teeth, which facilitates the fitting of the teeth into the base 32 of a denture plate. In the embodiment of my invention just described a metal wire may be substituted for the plastic rod and the wire withdrawn from the teeth after they are seated in and cemented to the walls of the recesses 50.

It should be mentioned that the denture plate shown in Fig. 10 is an upper plate, which is the one most difficult to produce in accurate form. After the upper plate has been completed with the teeth in permanent position in the base 32 it is a relatively simple operation to produce a lower plate with the teeth in complementary relation with those of the upper plate.

In Fig. 16 is shown a modified form of anterior tooth structure provided with a rearward projection 60 having therein an opening 62 to receive the rod 20, thus enabling the positive initial engagement of the rod with all the teeth in the row.

From the foregoing description it will be seen that I have provided simple, inexpensive and effective means for eliminating guess-work in the arranging of artificial teeth in harmony with condylar inclination of individual patients thus not only insuring against discomfort to the patients but also greatly reducing the time required of a dentist or technician in making a set of artificial dentures. It will also be seen that I have provided simple and inexpensive means whereby any number of sets of artificial dentures may be consecutively made corresponding precisely in arrangement of the teeth to a denture used as a pattern.

Although several embodiments of my invention have been shown and described, it is obvious that various changes and modifications may be made without departing from the spirit of my invention. Therefore, it should be understood that the embodiments of my invention shown and described are intended to be illustrative only and limited only within the scope of the appended claims.

I claim:

1. An assembly of artificial teeth comprising, in combination, a horizontal support having therein a preformed curved surface, a plurality of artificial teeth arranged in a row with their occlusal ends seated on said surface, means for holding said teeth in contact with said surface, a flexible rod in engagement with said teeth, and a hardening plastic material applied to said rod and said teeth for rigidly securing said teeth to said rod and maintaining them in the same curved relation as formed by said curved surface.

2. An assembly of artificial teeth comprising, in combination, a horizontal support having therein a preformed curved surface, a plurality of artificial teeth arranged in a row with their occlusal ends seated on said surface, said respective teeth being provided with means for engagement with a flexible rod, a flexible rod in engagement with said means, and a hardening plastic material applied to said rod and said teeth for rigidly securing said teeth to said rod and maintaining them in the same curved relation as formed by said curved surface.

3. An assembly of artificial teeth comprising, in combination, a horizontal support having therein a preformed curved surface, a plurality of artificial teeth arranged in a row with their occlusal ends seated on said surface, said respective teeth being provided with transverse through openings, a flexible rod projecting through said openings, and a hardening plastic material applied to said rod and said teeth for rigidly securing said teeth to said rod and maintaining them in the same curved relation as formed by said curved surface.

4. An assembly of artificial teeth comprising, in combination, a horizontal support having therein a preformed curved surface, a plurality of artificial teeth arranged in a row with their occlusal ends seated on said surface, said respective teeth being provided with transverse through openings and with sockets extending from the root ends of said teeth to said transverse openings, a flexible rod projecting through said transverse openings, and a hardening plastic material applied in said sockets to said rod and said teeth for rigidly securing said teeth to said rod and maintaining them in the same curved relation as formed by said curved surface.

5. An assembly of artificial teeth comprising, in combination, a horizontal support, having therein a preformed curved surface, a plurality of artificial teeth arranged in a row with their occlusal ends seated on said surface, said respective teeth being provided with horizontally disposed projections extending rearwardly from said teeth, and a hardening plastic material applied to said teeth for rigidly securing said teeth together and maintaining them in the same curved relation as formed by said curved surface.

6. An assembly of artificial teeth according to claim 1 in which said flexible rod is of hardened plastic material.

7. An assembly of artificial teeth according to claim 1 and including means engaging said flexible rod and the end teeth in said row for initially securing said teeth to said rod in fixed relation thereto.

8. An assembly of artificial teeth according to claim 1 in which the means for holding said teeth in contact with the curved surface consist of separate fingers of hardened plastic material for engagement with the root ends of the respective teeth.

9. An assembly of artificial teeth according to claim 1 in which the curved surface of the horizontal support is surrounded by an upwardly projecting rim having recesses in its inner wall to receive the frontal portions of said teeth.

10. An assembly of artificial teeth according to claim 1 in which the hardening plastic material is applied continuously to the rear surfaces of all the teeth in the row to join all of said teeth together in a single integral unit.

References Cited in the file of this patent

UNITED STATES PATENTS 1,495,390    Hollingsworth  ---------- May 27, 1924